(12) United States Patent
Nishihara (10) Patent No.: US 9,604,364 B2
(45) Date of Patent: Mar. 28, 2017

(54) PICKING APPARATUS AND PICKING METHOD

(71) Applicant: Toshiba Kikai Kabushiki Kaisha, Chiyoda-ku, Tokyo-to (JP)

(72) Inventor: Yasunori Nishihara, Numazu (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/708,005

(22) Filed: May 8, 2015

(65) Prior Publication Data

US 2015/0321354 A1 Nov. 12, 2015

(30) Foreign Application Priority Data

May 8, 2014 (JP) ................................ 2014-097129

(51) Int. Cl.
*G05B 19/00* (2006.01)
*B25J 9/16* (2006.01)
(52) U.S. Cl.
CPC ... *B25J 9/1697* (2013.01); *G05B 2219/37567* (2013.01); *G05B 2219/39476* (2013.01); *G05B 2219/40053* (2013.01)
(58) Field of Classification Search
CPC combination set(s) only.
See application file for complete search history.

(56) References Cited

U.S. PATENT DOCUMENTS 6,721,444 B1* 4/2004 Gu .................. B25J 9/1697
345/419
7,084,900 B1* 8/2006 Watanabe ............ G06K 9/6203
348/94
(Continued)

FOREIGN PATENT DOCUMENTS

CN 103568024 2/2014
CN 103732363 4/2014
(Continued)

OTHER PUBLICATIONS

German Office Action issued in DE 10 2015 208 584.8 dated Nov. 3, 2015 with English Language Translation.
(Continued)

*Primary Examiner* — Jonathan L Sample
(74) *Attorney, Agent, or Firm* — DLA Piper LLP US (57) ABSTRACT

A picking apparatus includes: a three-dimensional imaging device configured to three-dimensionally-image workpieces contained in bulk in a container; a robot arm having a hand capable of gripping a workpiece; and a control device configured to control an operation of the robot arm; the control device is configured: to recognize a position and a posture of a target workpiece, based on an imaging result of the three-dimensional imaging device; to obtain an gripping position of the workpiece and an approach vector thereof, based on the recognized position and posture information; to calculate an intersection point between a straight line extending along the approach vector through the gripping position and a plane including an opening of the container; and to judge whether the workpiece can be picked or not, based on a positional relationship between the intersection point and the opening.

18 Claims, 6 Drawing Sheets

(56) References Cited

U.S. PATENT DOCUMENTS

| | | | | |
|---|---|---|---|---|
| 7,177,459 B1* | 2/2007 | Watanabe | B25J 9/1697 | 382/151 |
| 7,313,464 B1* | 12/2007 | Perreault | B25J 9/1666 | 318/568.1 |
| 8,165,403 B1* | 4/2012 | Ramalingam | G06T 7/0046 | 348/511 |
| 8,295,975 B2* | 10/2012 | Arimatsu | B25J 9/1697 | 700/216 |
| 9,102,055 B1* | 8/2015 | Konolige | B25J 9/163 | |
| 2002/0169522 A1* | 11/2002 | Kanno | B25J 9/1666 | 700/245 |
| 2003/0144765 A1* | 7/2003 | Habibi | B25J 9/1697 | 700/259 |
| 2004/0019405 A1* | 1/2004 | Ban | B25J 9/1697 | 700/213 |
| 2004/0041808 A1* | 3/2004 | Ban | G06T 7/0046 | 345/419 |
| 2004/0117066 A1* | 6/2004 | Ban | B07C 5/10 | 700/245 |
| 2004/0172164 A1* | 9/2004 | Habibi | B25J 9/1692 | 700/245 |
| 2004/0186624 A1* | 9/2004 | Oda | B25J 9/1697 | 700/245 |
| 2004/0190766 A1* | 9/2004 | Watanabe | B25J 9/1697 | 382/154 |
| 2005/0071048 A1* | 3/2005 | Watanabe | B25J 9/1664 | 700/259 |
| 2006/0104788 A1* | 5/2006 | Ban | B25J 9/1697 | 414/729 |
| 2007/0177790 A1* | 8/2007 | Ban | B25J 9/1697 | 382/153 |
| 2007/0213874 A1* | 9/2007 | Oumi | B25J 9/1697 | 700/245 |
| 2007/0274812 A1* | 11/2007 | Ban | B25J 9/1697 | 414/217 |
| 2007/0282485 A1* | 12/2007 | Nagatsuka | B25J 9/1671 | 700/245 |
| 2008/0082213 A1* | 4/2008 | Ban | B25J 9/1697 | 700/260 |
| 2008/0240511 A1* | 10/2008 | Ban | B25J 9/1697 | 382/108 |
| 2008/0253612 A1* | 10/2008 | Reyier | B25J 9/1697 | 382/103 |
| 2009/0033655 A1* | 2/2009 | Boca | B25J 9/1697 | 345/419 |
| 2009/0148034 A1* | 6/2009 | Higaki | G06K 9/6857 | 382/153 |
| 2009/0149985 A1* | 6/2009 | Chirnomas | B65G 1/1373 | 700/215 |
| 2010/0004778 A1* | 1/2010 | Arimatsu | B25J 9/1697 | 700/214 |
| 2010/0092032 A1* | 4/2010 | Boca | B25J 9/1679 | 382/103 |
| 2010/0231711 A1* | 9/2010 | Taneno | G06K 9/00214 | 348/135 |
| 2010/0274391 A1* | 10/2010 | Dai | B25J 9/1697 | 700/259 |
| 2010/0296724 A1* | 11/2010 | Chang | G06K 9/00208 | 382/154 |
| 2011/0122231 A1* | 5/2011 | Fujieda | G06T 7/0075 | 348/47 |
| 2011/0153082 A1* | 6/2011 | Franck | G01B 11/026 | 700/259 |
| 2012/0072022 A1* | 3/2012 | Kim | B25J 9/1612 | 700/255 |
| 2012/0098961 A1* | 4/2012 | Handa | G01B 11/2518 | 348/135 |
| 2012/0158180 A1* | 6/2012 | Iio | B25J 9/1679 | 700/259 |
| 2012/0182296 A1* | 7/2012 | Han | G06F 3/04883 | 345/419 |
| 2012/0265342 A1* | 10/2012 | Kumiya | B25J 9/1676 | 700/255 |
| 2013/0266205 A1* | 10/2013 | Valpola | B25J 9/1669 | 382/153 |
| 2014/0031985 A1* | 1/2014 | Kumiya | B25J 9/1697 | 700/259 |
| 2014/0039679 A1* | 2/2014 | Ando | B25J 9/1697 | 700/259 |
| 2014/0067127 A1* | 3/2014 | Gotou | B25J 9/1697 | 700/259 |
| 2014/0074288 A1* | 3/2014 | Satou | B25J 9/1679 | 700/253 |
| 2014/0121836 A1* | 5/2014 | Ban | B25J 9/0093 | 700/259 |
| 2014/0163737 A1* | 6/2014 | Nagata | B25J 9/1697 | 700/259 |
| 2014/0277731 A1* | 9/2014 | Kamiya | B25J 9/1697 | 700/259 |
| 2014/0316573 A1* | 10/2014 | Iwatake | B25J 9/1694 | 700/258 |

FOREIGN PATENT DOCUMENTS

| | | | |
|---|---|---|---|
| CN | 103770112 | 5/2014 | |
| CN | 104057447 | 9/2014 | |
| DE | 602 05 300 | 12/2005 | |
| DE | 10 2013 012 224 | 2/2014 | |
| JP | 2002-071313 | 3/2002 | |
| JP | 2002-331480 | 11/2002 | |
| JP | EP 1512500 A2 * | 3/2005 | B25J 9/0096 |
| JP | 3925020 | 3/2007 | |
| JP | 2011-177863 | 9/2011 | |
| JP | 2012-223845 | 11/2012 | |

OTHER PUBLICATIONS

English Language Abstract and Translation for JP 2001-79669 published Jul. 3, 2001.
German Office Action issued in DE 10 2015 208 584.8 dated Oct. 30, 2015 with English Language Translation.
English Language Abstract for DE 10 2013 012 224 published Feb. 6, 2014.
English Language Abstract for DE 602 05 300 published Dec. 29, 2005.
English Language Abstract and Translation for JP 2012-223845 published Nov. 15, 2012.
English Language Abstract and Translation for JP 200-179669 published Jul. 3, 2001.
Chinese Office Action (with English Translation) issued in Chinese Application No. 201510231422.4 dated Jul. 5, 2016.
English Language Abstract and Translation of CN 103568024 published Feb. 12, 2014.
English Language Abstract and Translation of CN 104057447 published Sep. 24, 2014.
English Language Abstract and Translation of CN 103732363 published Apr. 16, 2014.
English Language Abstract and Translation of CN 103770112 published May 7, 2014.
English Language Abstract and Translation of JP 2002-331480 published Nov. 19, 2002.
English Language Abstract and Translation of JP 2011-177863 published Sep. 15, 2011.
English Language Abstract of JP 2002-071313 published Mar. 8, 2002.

* cited by examiner

PICKING APPARATUS AND PICKING METHOD

CROSS REFERENCE TO RELATED APPLICATIONS

This application claims priority from Japanese Patent Application No. 2014-097129 filed May 8, 2014. The entirety of the above-listed application is incorporated herein by reference.

FIELD OF THE INVENTION

The present invention relates to a picking apparatus and a picking method for picking a workpiece from workpieces contained in bulk in a container.

BACKGROUND ART

There is currently known an apparatus that detects a target workpiece from workpieces contained in bulk in a box by using a three-dimensional image recognition device, recognizes a position and a posture of the workpiece, transmits information about the position and the posture to a controller of a robot arm through communication means, and picks the workpiece by controlling an operation of the robot arm based on the information about the position and the posture.

Depending on the position and the posture of the target workpiece, there is a possibility that a hand of the robot arm and the box interfere with each other when picking, so that the hand or the box is damaged. Damage of the hand or the box impairs a working efficiency.

In order to solve this problem, JP2012-223845A discloses an apparatus that creates three-dimensional polygon data about a shape of the hand of the robot arm and a shape of the box, and checks an interference between the polygon data of the hand and the polygon data of the box, on a real-time basis.

SUMMARY OF THE INVENTION

However, the apparatus described in JP2012-223845A has the following disadvantages. Namely, it is necessary for the apparatus to judge the interference on a realtime basis during the operation of the robot arm. In addition, since a simulation is carried out before the operation based on a plurality of evaluation positions, the simulation is highly precise but is not easy or convenient, requiring considerable computing capacity. Moreover, each time when the shape of the hand or the shape of the box is changed, a model is needed to be redefined. Namely, the apparatus lacks versatility.

The present invention has been made in view of the above circumstances. The object of the present invention is to provide a picking apparatus and a picking method capable of previously judging, before an operation of a robot arm, whether a workpiece can be picked or not without any interference with a container, and capable of achieving such a judgment on whether the picking is possible or not by a simple method requiring shorter computing time.

The present invention is a picking apparatus including: a three-dimensional imaging device configured to three-dimensionally image workpieces contained in bulk in a container; a robot arm having a hand capable of gripping a workpiece; and a control device configured to control an operation of the robot arm; wherein the control device is configured: to recognize a position and a posture of a target workpiece, based on an imaging result of the three-dimensional imaging device; to obtain a gripping position of the workpiece and an approach vector thereof, based on the recognized position and posture information; to calculate an intersection point between a straight line extending along the approach vector through the gripping position and a plane including an opening of the container; and to judge whether the workpiece can be picked or not, based on a positional relationship between the intersection point and the opening.

According to the present invention, before an operation of the robot arm, whether the workpiece can be picked or not without any interference between the hand or the workpiece gripped by the hand and the container is previously judged by the control device, and such a judgment on whether the picking is possible or not is achieved by the simple method requiring shorter computing time. Thus, the workpiece can be picked safely and efficiently, without damaging the hand and the container.

To be specific, for example, the control device is configured: to judge whether a condition, in which the intersection point is located inside the opening and a shortest distance between the intersection point and a peripheral part defining the opening is larger than a predetermined value, is satisfied or not; and to cause the robot arm to pick the workpiece, when the condition is satisfied; or not to cause the robot arm to pick the workpiece, when the condition is not satisfied.

Preferably, the predetermined value is 1 to 1.1 times any larger one of a maximum value of a distance between the gripping position and a profile of the workpiece in a direction orthogonal to the approach vector and a maximum value of a distance between the gripping position and a profile of the hand in the direction orthogonal to the approach vector. According to this embodiment, it can be reliably prevented that the hand that is linearly moved along the approach vector or the workpiece gripped by the hand and the container interfere with each other when picking.

In addition, preferably, the control device is configured to operate the robot arm such that the hand is brought into contact with a peripheral part defining the Opening, to thereby obtain a position of the peripheral part. According to this embodiment, the position of the peripheral part defining the opening can be easily obtained.

Alternatively, the picking apparatus further includes a sensor configured to detect a position of a position indicating marker disposed around the opening, wherein the control unit is configured to obtain a position of a peripheral part defining the opening based on a detection result of the sensor. Also according to this embodiment, the position of the peripheral part defining the opening can be easily obtained.

In addition, the present invention is a picking method including: three-dimensionally imaging workpieces contained in bulk in a container; and controlling an operation of a robot arm having a hand capable of gripping a workpiece; wherein the controlling of the operation of the robot arm includes: recognizing a position and a posture of a target workpiece, based on an imaging result of the three-dimensionally imaging; obtaining a gripping position of the workpiece and an approach vector thereof, based on the recognized position and posture information; calculating an intersection point between a straight line extending along the approach vector through the gripping position and a plane including an opening of the container; and judging whether the workpiece can be picked or not, based on a positional relationship between the calculated intersection point and the opening.

According to the present invention, before an operation of the robot arm, whether the workpiece can be picked or not without any interference between the hand or the workpiece gripped by the hand and the container is previously judged, and such a judgment on whether the picking is possible or not is achieved by the simple method requiring shorter computing time. Thus, the workpiece can be picked safely and efficiently, without damaging the hand and the container.

To be specific, for example, the judging whether the workpiece can be picked or not includes: judging whether a condition, in which the intersection point is located inside the opening and a shortest distance between the intersection point and a peripheral part defining the opening is larger than a predetermined value, is satisfied or not; and causing the robot arm to pick the workpiece, when the condition is satisfied; or not causing the robot arm to pick the workpiece, when the condition is not satisfied.

Preferably, the predetermined value is 1 to 1.1 times any larger one of a maximum value of a distance between the gripping position and a profile of the workpiece in a direction orthogonal to the approach vector and a maximum value of a distance between the gripping position and a profile of the hand in the direction orthogonal to the approach vector. According to this embodiment, it can be reliably prevented that the hand that is linearly moved along the approach vector or the workpiece gripped by the hand and the container interfere with each other when picking.

In addition, preferably, the picking method further includes operating the robot arm such that the hand is brought into contact with a peripheral part defining the opening, to thereby obtain a position of the peripheral part. According to this embodiment, the position of the peripheral part defining the opening can be easily obtained.

Alternatively, the picking method further includes: detecting a position of a position indicating marker disposed around the opening; and obtaining a position of a peripheral part defining the opening based on a detection result of the detecting. Also according to this embodiment, the position of the peripheral part defining the opening can be easily obtained.

DETAILED DESCRIPTION OF THE INVENTION

An embodiment of the present invention will be described in detail below with reference to the attached drawings.

Figure 1:
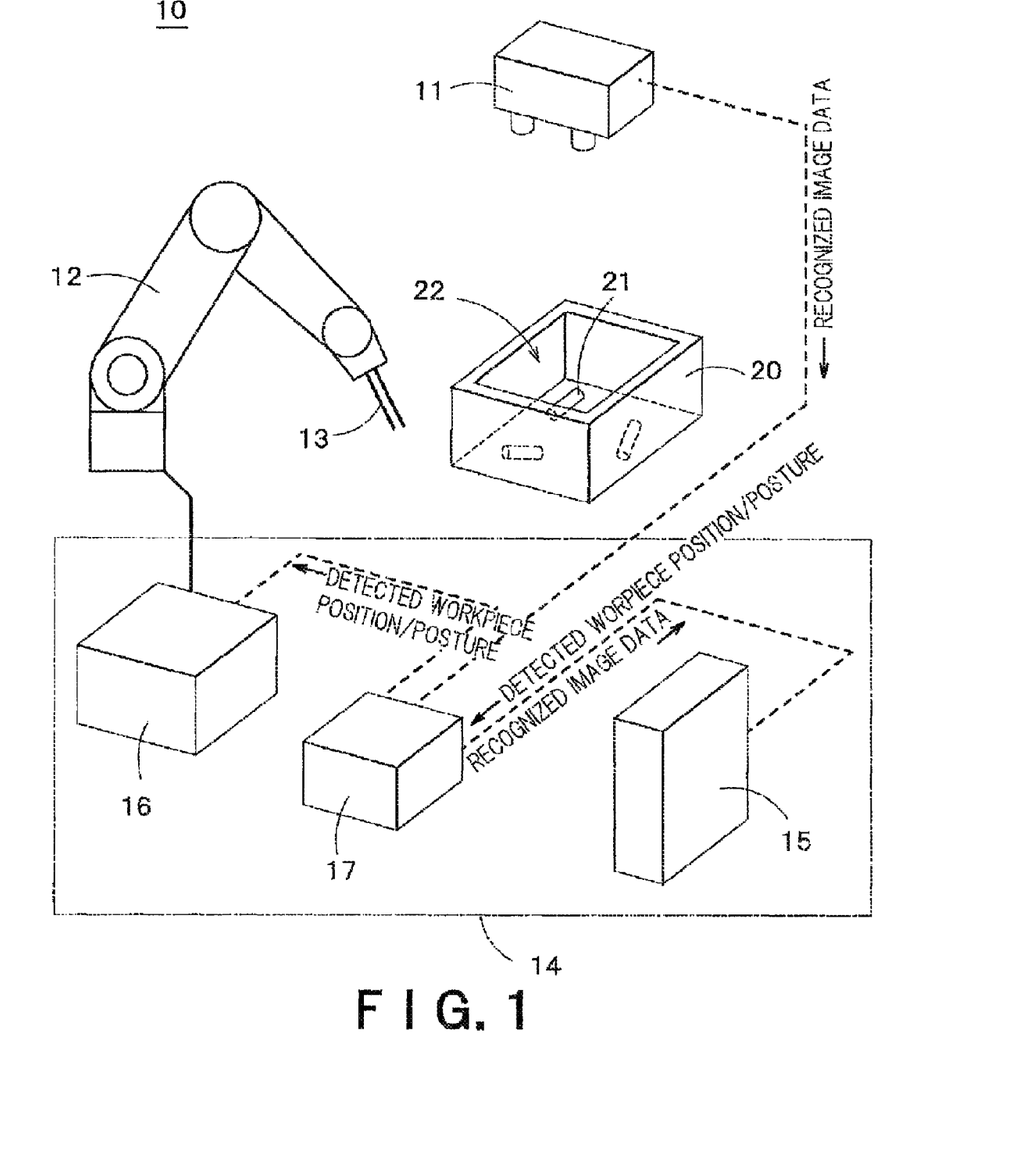
FIG. 1 is a schematic structural view showing a picking apparatus according to one embodiment of the present invention.

FIG. 1 is a schematic structural view showing a picking apparatus according to one embodiment of the present invention. As shown in FIG. 1, the picking apparatus 10 according to this embodiment includes a three-dimensional imaging device 11 configured to three-dimensionally imaging workpieces contained in bulk in a container 20, a robot arm 12 having a hand 13 capable of gripping a workpiece 21, and a control device 14 configured to control an operation of the robot arm 12.

The three-dimensional imaging device 11 is known per se as a known imaging device capable of obtaining three-dimensional information of a target object by a method such as stereo vision method, an optical cutting method, a band projection method and so on. The three-dimensional imaging device 11 is disposed to face an opening 22 of the container 20. Thus, the three-dimensional imaging device 11 can three-dimensionally image workpieces contained in bulk in the container 20 through the opening 22.

Figure 2:
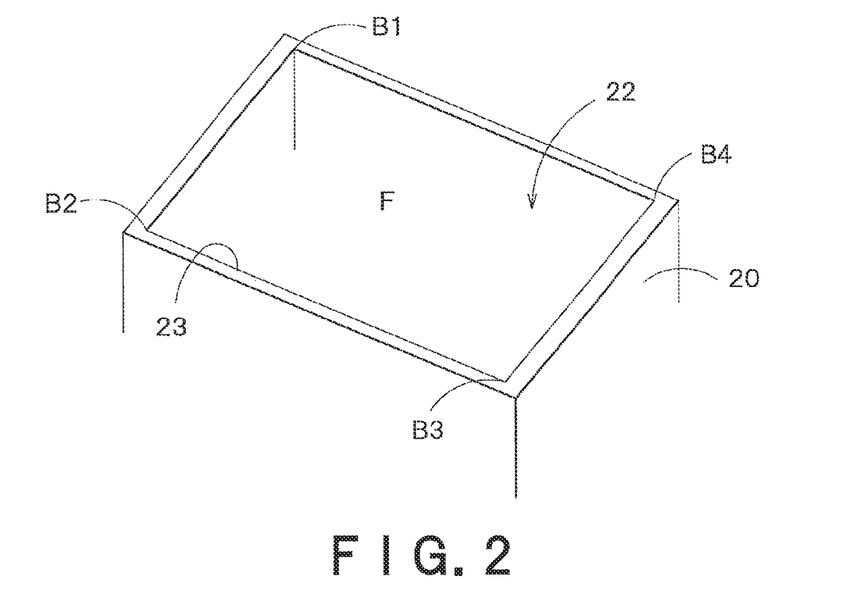
FIG. 2 is schematic enlarged view showing an opening of a container.

FIG. 2 is a schematic enlarged view showing the opening 22 of the container. In the illustrated example, the opening 22 of the container 20 has a rectangular shape with four apexes $B_1$, $B_2$, $B_3$ and $B_4$. A peripheral part 23 defining the opening 22 is composed of four ridge lines. Herein, the respective apexes $B_2$, $B_3$ and $B_4$ are present in a world coordinate system that is a reference coordinate system of the picking apparatus 10, and are defined in this order ($B_1$, $B_2$, $B_3$, $B_4$) about a Z-axis (right-hand screw rule) of the world coordinate system.

As shown in FIG. 1, the control device 14 in this embodiment includes an image recognition unit 15, a robot controller 16, and a network hub 17 communicably connecting the robot controller 16, the image recognition unit 15 and the three-dimensional imaging device 11. The Ethernet (registered trademark) standard is suitably employed as a communication connection standard, for example.

The image recognition unit 15 is configured to read out three-dimensional data imaged by the three-dimensional imaging device 11 through the network hub 17, and is configured to store the three-dimensional data in a storage unit. The image recognition unit 15 is constituted of a computer system including a storage unit storing a commercially available three-dimensional recognition program or the like. The three-dimensional image recognition program stored in the storage unit is configured to analyze workpieces contained in bulk in the container 20, based on the three-dimensional image data read out from the three-dimensional imaging device 11, to retrieve therefrom a part (i.e., target workpiece) having image data conforming to a pre-stored model workpiece shape, and to recognize a position and a posture of the retrieved part.

The robot controller 16 is configured to read out the information about the position and the posture (position and posture information) recognized by the image recognition unit 15 through the network hub 17. Based on the position and posture information read out from the image recognition unit 15, the robot controller 16 is configured to obtain a gripping position of the target workpiece 21 and an approach vector thereof in the world coordinate system. The approach vector herein means a direction in which the hand 13 of the robot arm 12 linearly approaches the gripping position of the workpiece 21 when picking. Based on the information about the gripping position of the target workpiece 21 and the approach vector thereof, the robot controller 16 is configured to control an operation of the robot arm 12.

A vertical articulated robot known per se is used as the robot arm 12, for example. In the illustrated example, the number of articulations of the robot arm 12 is six (hexaxial). A drive source (e.g., servomotor) provided on each articulation is driven by a desired amount by a control output from the robot controller 16, whereby the robot arm 12 is moved and/or rotated such that a distal end thereof is located on a desired position with a desired posture.

The distal end of the robot arm 12 is equipped with the hand 13 capable of gripping a workpiece 21. The gripping operation herein may be an absorbing operation by a magnetic force or a negative pressure, etc., as well as a holding operation such as a pinching operation.

In the illustrated example, the hand 13 has a pair of elongate movable members. The pair of elongate movable members are opposedly arranged in parallel with each other, and are pneumatically movable relatively to each other, for example. When the pair of elongate movable members come close to each other, a workpiece 21 located in position between the pair of elongate movable members is pinched and gripped by the pair elongate movable members. On the other hand, when the pair of elongate movable members separate away from each other, the workpiece 21 gripped between the pair of elongate movable members is released.

An operation of the robot arm 12 when picking is described. Firstly, the hand 13 on the distal end of the robot arm 12 is moved from a predetermined standby position to an approach position outside the container 20. The approach position herein means a predetermined position outside the container 20, which is on a straight line L extending along the approach vector through the gripping position of the target workpiece 21 (e.g., position distant from the gripping position of the workpiece 21 by 100 mm). At the approach position, the pair of elongate movable members of the hand 13 are oriented in a direction extending along the approach vector. Then, the hand 13 is linearly moved from the approach position to the gripping position of the workpiece along the approach vector, so that the target workpiece 21 is located in position between the pair of elongate movable members. At the gripping position of the workpiece, the target workpiece 21 is gripped by the hand 13. Then, the hand 13 gripping the workpiece 21 is linearly moved from the gripping position of the workpiece along the approach vector to return to the approach position. Thereafter, the hand 13 is moved from the approach position to the standby position or a predetermined release position of the workpiece.

In this embodiment, the robot controller 16 is configured to operate the robot arm 12 such that the hand 13 is brought into contact with the peripheral part 23 defining the opening 22 of the container 20, so as to obtain a position of the peripheral part 23 in the world coordinate system. In more detail, the robot controller 16 operates the robot arm 12 such that the hand 13 is brought close to the peripheral part 23 of the container 20. By detecting a contact pressure generated upon contact, the robot controller 16 judges whether the hand 13 comes into contact with the peripheral part 23 or not. When it is judged that the hand 13 came into contact with the peripheral part 23, a position coordinate value of the peripheral part 23 defining the opening 22 is obtained from a position coordinate value of the hand 13 at this time.

In addition, in this embodiment, the robot controller 16 is configured to calculate an intersection point M between a straight line L, which extends along the approach vector through the gripping position of the target workpiece 21, and a plane F including the opening 22.

Figure 3:
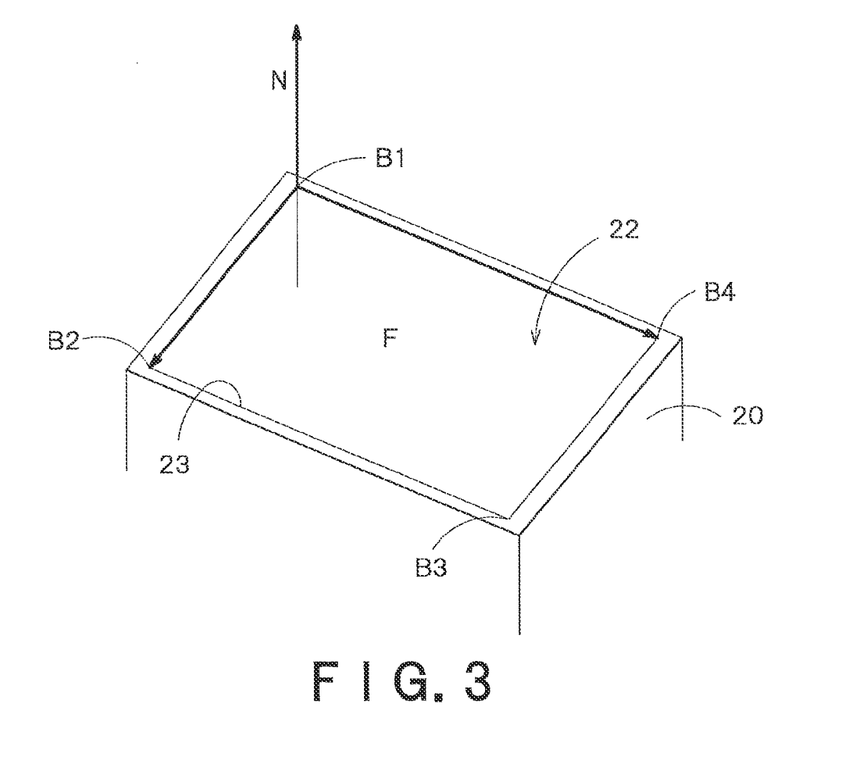
FIG. 3 is a schematic view for explaining a method for obtaining an equation of a plane including the opening of the container.

An example of a method of calculating the intersection point M is described. Firstly, as shown in FIG. 3, an equation of the plane F including the opening 22 is obtained from a position of the peripheral part 23 defining the opening 22. Specifically, for example, a normal vector $N=(n_x, n_y, n_z)$ of the plane F is an outer product of a vector from the apex $B_1$ to the apex $B_2$ of the opening 22 and a vector from the apex $B_1$ to the apex $B_4$, and is shown by the following equation (1).

$$N = \overrightarrow{B_1 B_2} \times \overrightarrow{B_1 B_4} \qquad (1)$$

By using a coordinate value $B_1$: $(x_1, y_1, z_1)$ in the world coordinate system of the apex $B_1$ of the opening 22, an equation of the plane F that is perpendicular to the normal vector N through the apex $B_1$ is shown by the following equation (2).

$$n_x(x-x_1) + n_y(y-y_1) + n_z(z-z_1) = 0 \qquad (2)$$

Figure 4:
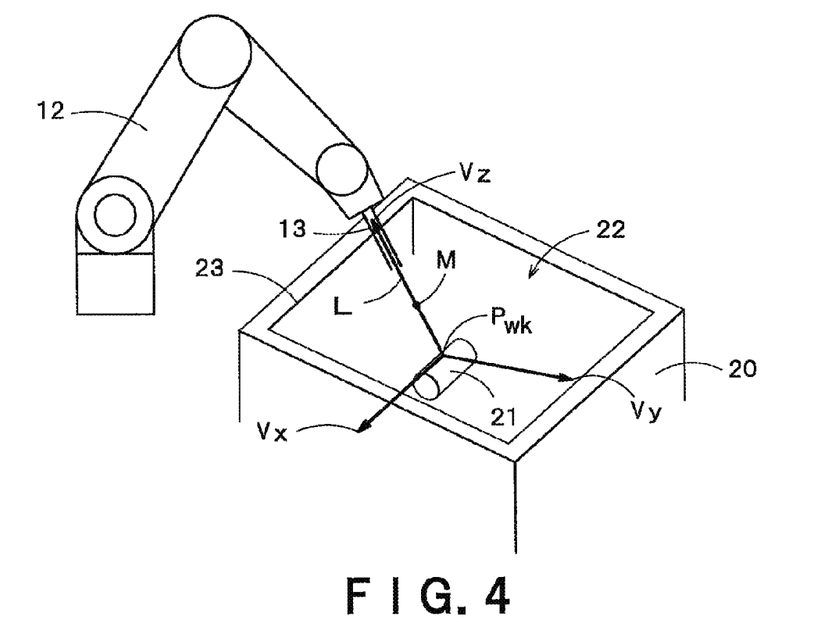
FIG. 4 is a schematic view for explaining a step for obtaining an intersection point between a straight line, which is in parallel with an approach vector and pass through a gripping position of a workpiece, and the plane including the opening of the container.

Then, as shown in FIG. 4, an equation of the straight line L extending along the approach vector through the gripping position of the workpiece 21 is obtained. Specifically, for example, a posture matrix $R_{abc}$ of the workpiece 21 is obtained from a position and a posture $P_{wk}$: $(X_{wk}, y_{wk}, z_{wk}, a_{wk}, b_{wk}, c_{wk})$ of the workpiece 21 recognized by the image recognition unit 15. Herein, $(x_{wk}, y_{wk}, z_{wk})$ shows the position (origin position) of the workpiece 21 in the world coordinate system. In addition, $(a_{wk}, b_{wk}, c_{wk})$ shows the posture of the workpiece 21 in the world coordinate system. Namely, $a_{wk}$ shows rotation about an X-axis of the world coordinate system, $b_{wk}$ shows rotation about a Y-axis of the world coordinate system, and $c_{wk}$ shows rotation about a Z-axis of the world coordinate system.

In more detail, for example, the "Z, Y, X Euler angles expression" is employed as a distal end posture expression of the robot, and the reference coordinate system (world coordinate system) "Σi" is rotated in the following order. Namely, (i) the reference coordinate system "Σi" is rotated about the Z-axis by $c_{wk}$. (ii) Then, the rotated coordinate system "Σ'" is rotated about the Y-axis by $b_{wk}$. (iii) Then, the rotated coordinate system "Σ''" is rotated about the X-axis by $a_{wk}$.

The respective rotation matrices of the above (i) to (iii) are shown by the following equation (3).

$$R_z(c_{wk}) = \begin{pmatrix} cc & -sc & 0 \\ sc & cc & 0 \\ 0 & 0 & 1 \end{pmatrix}, R_y(b_{wk}) = \begin{pmatrix} cb & 0 & sb \\ 0 & 1 & 0 \\ -sb & 0 & cb \end{pmatrix}, \qquad (3)$$

$$R_x(a_{wk}) = \begin{pmatrix} 1 & 0 & 0 \\ 0 & ca & -sa \\ 0 & sa & ca \end{pmatrix}$$

wherein sa=sin($a_{wk}$), sb=sin($b_{wk}$), sc=sin($c_{wk}$), ca=cos($a_{wk}$), cb=cos($b_{wk}$), and cc=cos($c_{wk}$), In the Euler angles expression, since the conversion matrices of the rotated coordinate systems are multiplied from the right side in sequence, the posture matrix $R_{abc}$ of the workpiece 21 is shown by the following equation (4).

$$R_{abc} = \begin{pmatrix} r_{11} & r_{12} & r_{13} \\ r_{21} & r_{22} & r_{23} \\ r_{31} & r_{32} & r_{33} \end{pmatrix} \quad (4)$$

$$= \begin{pmatrix} cc & -sc & 0 \\ sc & cc & 0 \\ 0 & 0 & 1 \end{pmatrix} \cdot \begin{pmatrix} cb & 0 & sb \\ 0 & 1 & 0 \\ -sb & 0 & cb \end{pmatrix} \cdot \begin{pmatrix} 1 & 0 & 0 \\ 0 & ca & -sa \\ 0 & sa & ca \end{pmatrix}$$

$$= \begin{pmatrix} cb \cdot cc & -ca \cdot sc + cc \cdot sa \cdot sb & sa \cdot sc + ca \cdot cc \cdot sb \\ sc \cdot sc & ca \cdot cc + sa \cdot sb \cdot sc & -cc \cdot sa + ca \cdot sb \cdot sc \\ -sb & cb \cdot sa & ca \cdot sb \end{pmatrix}$$

The approach vector of the workpiece 21 is the Z-axis vector of the coordinate system showing the posture of the workpiece 21, and is given by $v_z(r_{13}, r_{23}, r_{33})$. The approach vector of the workpiece 12 is equivalent to a direction vector of the straight line L. Thus, when the gripping position of the workpiece 21 conforms to the origin position, an equation of the straight line L is shown by the following equations (5), (6) and (7) using a parameter t.

$$x = x_{wk} + t \cdot r_{13} \quad (5)$$

$$y = y_{wk} + t \cdot r_{23} \quad (6)$$

$$z = z_{wk} + t \cdot r_{33} \quad (7)$$

In order to obtain the intersection point M between the plane F and the straight. The L, the equations (5), (6) and (7) are substituted in the equation (2), and the resulted equation is deformed as to the parameter t, to thereby obtain the following equation (8).

$$t = \frac{n_x(x_1 - x_{wk}) + n_y(y_1 - y_{wk}) + n_z(z_1 - z_{wk})}{n_x \cdot r_{31} + n_y \cdot r_{32} + n_z \cdot r_{33}} \quad (8)$$

By respectively substituting the equation (8) into the equations (5), (6) and (7), an intersection point coordinate M: ($x_M$, $y_M$, $z_M$) between the plane F and the straight line L is obtained.

In addition, in this embodiment, as shown in FIG. 4, the robot controller 16 is configured to judge whether the workpiece 21 can be picked or not, based on a positional relationship between the calculated intersection point M and the opening 22.

Figure 5:
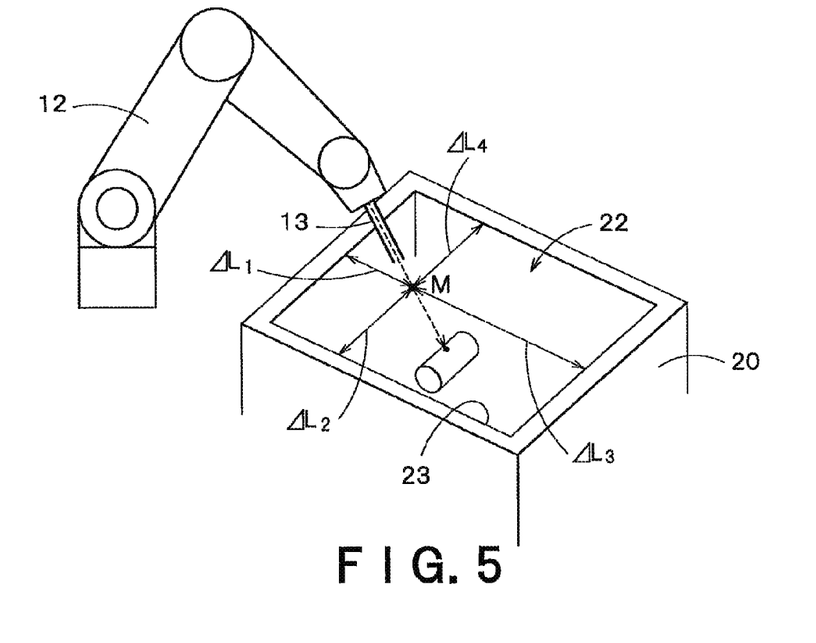
FIG. 5 is a schematic view for explaining a step of judging whether a condition, in which the intersection point is located inside the opening and a shortest distance between the intersection point and a peripheral part defining the opening is larger than a predetermined value, is satisfied or not.

Specifically, for example, as shown in Hg. 5, the robot controller 16 is configured to judge whether a condition (hereinafter referred to as non-interference condition) in which the intersection point M is located inside the opening 22 and shortest distances $\Delta L_1$, $\Delta L_2$, $\Delta L_3$, $\Delta L_4$ between the intersection point M and the peripheral part 23 defining the opening 22 are larger than a predetermined value $\Delta r$. When the condition is satisfied, the robot controller 16 is configured to cause the robot arm 12 to pick the workpiece 21. When the condition is not satisfied, the robot controller 16 is configured not to cause the robot arm 12 to pick the workpiece 21.

Figure 9:
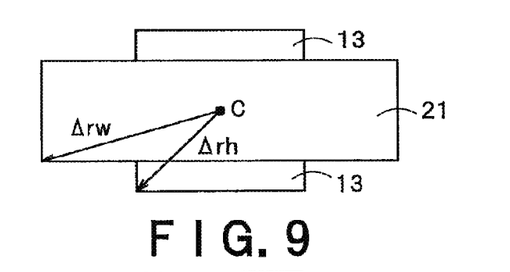
FIG. 9 is a sectional view of an example of a hand and a workpiece, taken along a plane orthogonal to the approach vector.
Figure 10:
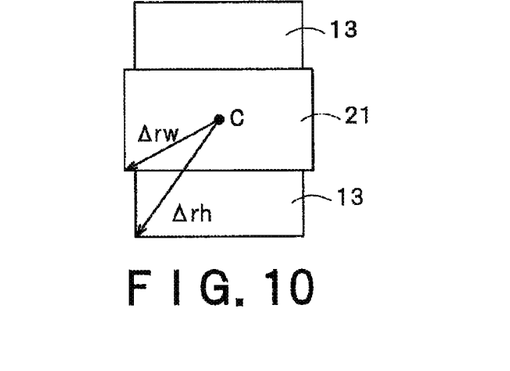
FIG. 10 is a sectional view of another example of a hand and a workpiece, taken along a plane orthogonal to the approach vector.

As shown in FIG. 9, in a direction orthogonal to the approach vector, when a maximum value $\Delta rw$ of a distance between the gripping position C and a profile of the workpiece 21 is larger than a maximum value $\Delta rh$ of a distance between the gripping position C and a profile of the hand 13 ($\Delta rw > \Delta rh$), the "predetermined value $\Delta r$" is preferably 1 to 1.1 times the maximum value $\Delta rw$ of the distance between the gripping position C and the profile of the workpiece 21 ($\Delta r = 1 \times \Delta rw$ to $1.1 \times \Delta rw$). On the other hand, as shown in FIG. 10, in the direction orthogonal to the approach vector, when the maximum value $\Delta rw$ of the distance between the gripping position C and the profile of the workpiece 21 is smaller than the maximum value $\Delta rh$ of the distance between the gripping position C and the profile of the hand 13 ($\Delta rw < \Delta rh$), the "predetermined value $\Delta r$" is preferably 1 to 1.1 times the maximum value $\Delta rh$ of the distance between the gripping position C and the profile of the hand 13 ($\Delta r = 1 \times \Delta rh$ to $1.1 \times \Delta rh$). When the predetermined value $\Delta r$ is smaller than 1 times, there is a possibility that the hand 13 or the workpiece 21 gripped by the hand 13 interferes with the container 20 in picking. On the other hand, when the predetermined value $\Delta r$ is larger than 1.1 times, a ratio of workpieces 21 that are not picked near a sidewall of the container 20 increases, which impairs a working efficiency.

Figure 6:
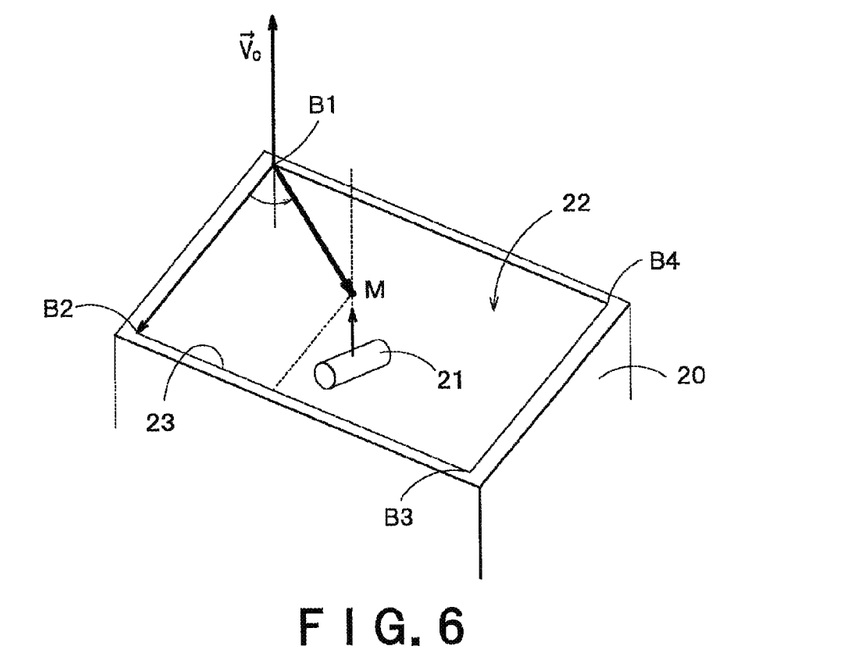
FIG. 6 is a schematic view showing that the intersection point is located inside the opening.

Next, an example of judging whether the non-interference condition is satisfied or not is described. Firstly, as shown in FIG. 6, it is judged whether a condition (first condition), in which the intersection point M is located inside the opening 22, is satisfied or not. Specifically, for example, in the peripheral part 23 defining the opening 22, an outer product vector of a ridge vector from the apex $B_1$ to the apex $B_2$ and a vector from the apex $B_1$ to the intersection point M is obtained by the following equation (9).

$$\vec{V}_{c1} = \overrightarrow{B_1 B_2} \times \overrightarrow{B_1 M} \quad (9)$$

Then, a Z-axis value of the outer product vector obtained by the above equation (9) is evaluated. When the Z-axis value is equal to or larger than zero, i.e., when the following equation (10) is satisfied, the intersection point M is located inside the opening 22 with respect to the ridge vector from the apex $B_1$ to the apex $B_2$, as shown in FIG. 6, by the right-handed screw rule.

$$\vec{V}_{c1} \cdot z \geq 0.0 \quad (10)$$

Figure 7:
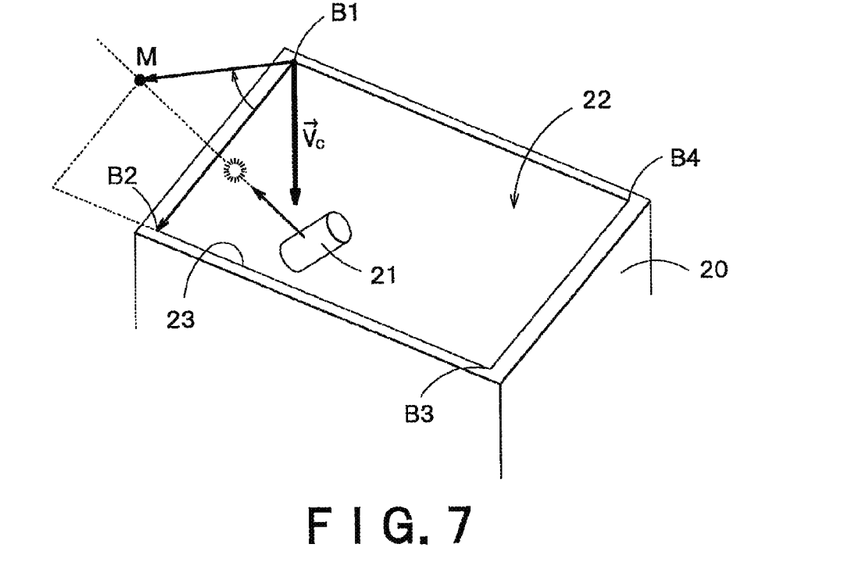
FIG. 7 is a schematic view showing that the intersection point is located outside the opening.

On the other hand, when the Z-axis value of the outer product vector is smaller than zero, i.e., when the following equation (11) is satisfied, the intersection point M is located oppposedly to the opening 22 with respect to the ridge vector from the apex $B_1$ to the apex $B_7$, as shown in FIG. 7, by the right-handed screw rule.

$$\vec{V}_{c1} \cdot z < 0.0 \quad (11)$$

The other ridge vectors of the peripheral part 23 defining the opening 22 are similarly evaluated. Namely, the following equations (12), (13) and (14) are obtained.

$$\vec{V}_{c2} = \overrightarrow{B_2 B_3} \times \overrightarrow{B_2 M} \quad (12)$$

$$\vec{V}_{c3} = \overrightarrow{B_3 B_4} \times \overrightarrow{B_3 M} \quad (13)$$

$$\vec{V}_{c4} = \overrightarrow{B_4 B_1} \times \overrightarrow{B_4 M} \quad (14)$$

Then, it is judged whether the following equation (15) is satisfied or not.

$$\vec{V}_{c1} \cdot z \geq 0.0 \text{ AND } \vec{V}_{c2} \cdot z \geq 0.0 \text{ AND } \vec{V}_{c3} \cdot z \geq 0.0 \text{ AND }$$
$$\vec{V}_{c4} \cdot z \geq 0.0 \quad (15)$$

When the above equation (15) is satisfied, the intersection point M is located inside the opening 22. On the other hand, when the above equation (15) is not satisfied, the intersection point M is located outside the opening 22.

Figure 8:
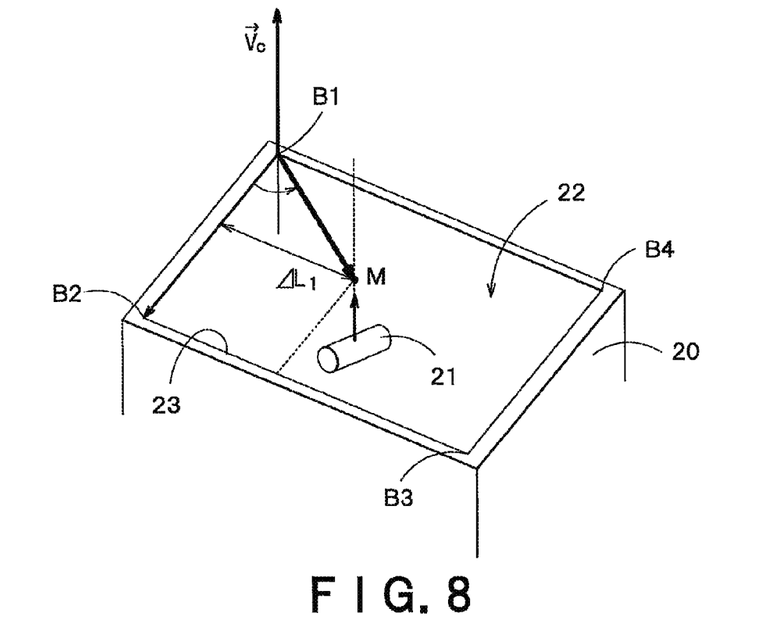
FIG. 8 is a schematic view for explaining a distance between the intersection point and the peripheral part defining the opening.

Next, it is judged whether a condition (second condition), in which a shortest distance between the intersection point M and the peripheral part 23 defining the opening 22 is larger than a predetermined value, is satisfied or not. Specifically, for example, in the peripheral part 23 defining the opening 22, an angle $\theta_1$ defined between the ridge vector from the apex $B_1$ to the apex $B_2$ and the vector from the apex $B_1$ to the intersection point M is obtained by the following equation (16).

$$\theta_1 = A\cos\left(\frac{\overrightarrow{B_1M} \cdot \overrightarrow{B_1B_2}}{|\overrightarrow{B_1M}| \cdot |\overrightarrow{B_1B_2}|}\right) \quad (16)$$

From the above equation (16), a shortest distance $\Delta L_1$ between the ridge vector from the apex $B_1$ up to the apex $B_2$ and the intersection point M is obtained by the following equation (17).

$$\Delta L_1 = |\overrightarrow{B_1M}|\sin(\theta_1) \quad (17)$$

The other ridge vectors of the peripheral part 23 defining the opening 22 are similarly evaluated. Namely, the following equations (18), (19) and (20) are obtained.

$$\theta_2 = A\cos\left(\frac{\overrightarrow{B_2M} \cdot \overrightarrow{B_2B_3}}{|\overrightarrow{B_2M}| \cdot |\overrightarrow{B_2B_3}|}\right) \quad (18)$$

$$\theta_3 = A\cos\left(\frac{\overrightarrow{B_3M} \cdot \overrightarrow{B_3B_4}}{|\overrightarrow{B_3M}| \cdot |\overrightarrow{B_3B_4}|}\right) \quad (19)$$

$$\theta_4 = A\cos\left(\frac{\overrightarrow{B_4M} \cdot \overrightarrow{B_4B_1}}{|\overrightarrow{B_4M}| \cdot |\overrightarrow{B_4B_1}|}\right) \quad (20)$$

Then, shortest distances $\Delta L_2$, $\Delta L_3$ and $\Delta L_4$ between the other ridge vectors of the peripheral part 23 defining the opening 22 and the intersection point M are obtained by the following equations (21), (22) and (23).

$$\Delta L_2 = |\overrightarrow{B_2M}|\sin(\theta_2) \quad (21)$$

$$\Delta L_3 = |\overrightarrow{B_3M}|\sin(\theta_3) \quad (22)$$

$$\Delta L_4 = |\overrightarrow{B_4M}|\sin(\theta_4) \quad (23)$$

It is judged whether the respective shortest distances $\Delta L_1$, $\Delta L_2$, $\Delta L_3$ and $\Delta L_4$ between the respective ridge vectors of the peripheral part 23 and the intersection point M are larger than the predetermined value $\Delta r$ or not. When at least one of $\Delta L_1$, $\Delta L_2$, $\Delta L_3$ and $\Delta L_4$ is smaller than the predetermined value $\Delta r$, there is a possibility that the hand 13 or the workpiece 21 gripped by the hand 13 interferes with the container 20.

Thus, when the aforementioned first and second conditions are both satisfied, the robot controller 16 judges that the hand 13 or the workpiece 21 gripped by the hand 13 and the container 20 do not interfere with each other, and causes the robot arm 12 to pick the workpiece 21. On the other hand, when one or both of the first and second conditions is not satisfied, the robot controller 16 judges that the hand 13 or the workpiece 21 gripped by the hand 13 and the container 20 may interfere with each other, and does not cause the robot arm 12 to pick the workpiece 21.

In this embodiment, the robot controller 16 obtains a gripping position of a target workpiece and an approach vector thereof, based on position and posture information recognized by the image recognition unit 15. However, not limited thereto, the image recognition unit 15 may obtain a gripping position of a target workpiece and an approach vector thereof, and the robot controller 16 may read out, through the network hub 17, the information about the gripping position of the workpiece and the approach vector thereof, which has been obtained by the image recognition unit 15. In addition, the image recognition unit 15 may calculate the intersection point M between the straight line L extending along the approach vector through the gripping position of the target workpiece 21 and the plane F including the opening 22, and may judge whether the intersection point M is located inside the opening 22 or not, and whether the shortest distance between the intersection point M and the peripheral part 23 defining the opening 22 is larger than the predetermined value $\Delta r$ or not. In this case, the robot controller 16 may read out, through the network hub 17, the result judged by the image recognition unit 15.

Figure 11:
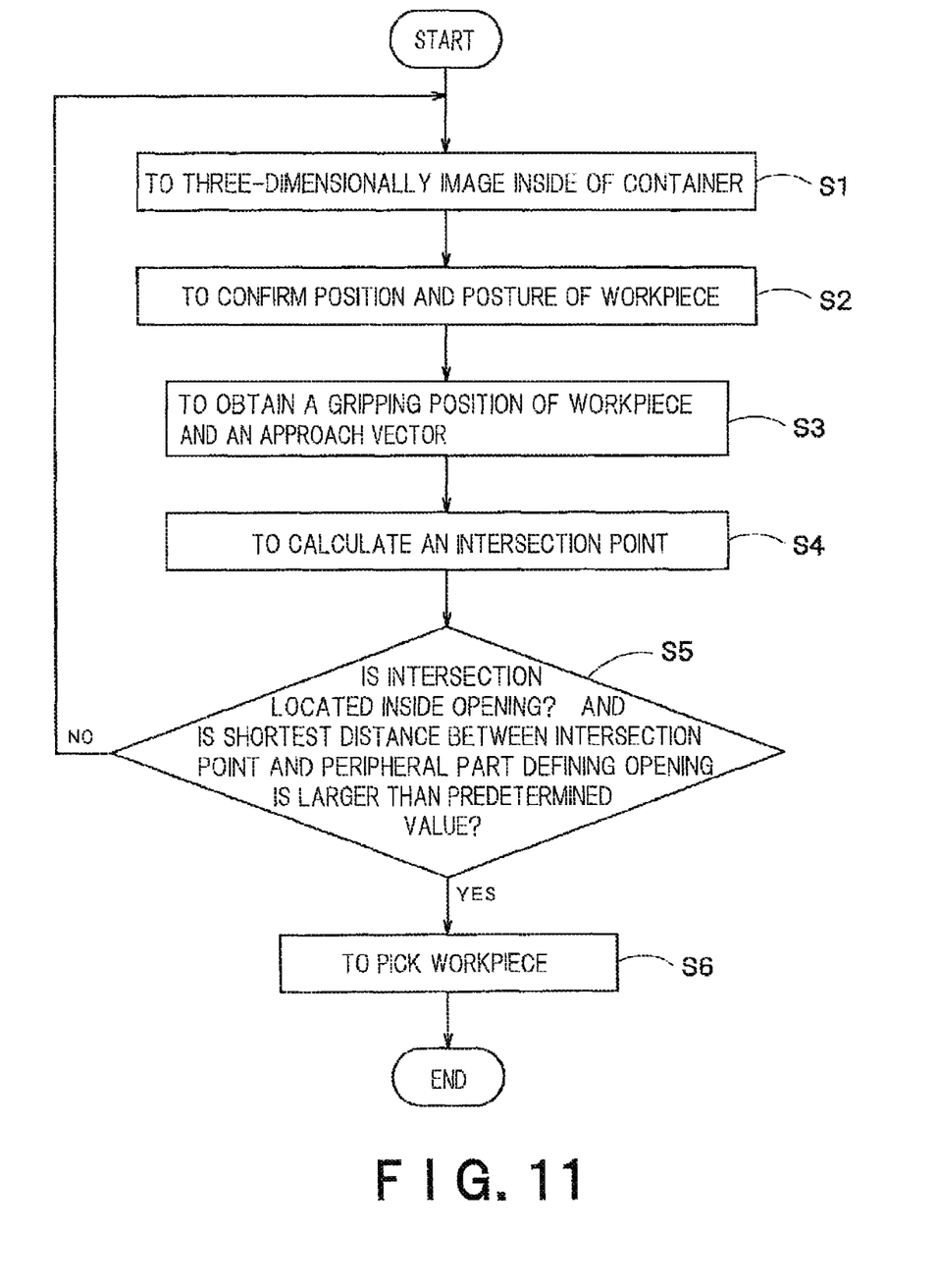
FIG. 11 is a flowchart showing a picking method according to one embodiment of the present invention.

Next, an operation of this embodiment as above (picking method according to one embodiment of the present invention) is described with reference to FIG. 11.

Firstly, the opening 22 of the container 20 containing workpieces in bulk is located in position so as to face the three-dimensional imaging device 11 of the picking apparatus 10.

Then, an operation of the robot arm 12 is controlled by the robot controller 16 such that the hand 13 of the robot arm 12 is brought into contact with the peripheral part 23 defining the opening 22 of the container 20, to thereby obtain a position coordinate value in the world coordinate system.

Then, an inside of the container 20 is three-dimensionally imaged by the three-dimensional imaging device 11 through the opening 22 (step S1). The imaging result of the three-dimensional imaging device 11 is read out by the image recognition unit 15 through the network hub 17.

The image recognition unit 15 recognizes a position and a posture of a target workpiece, based on the imaging result of the three-dimensional imaging device 11 (step S2). In more detail, the workpieces contained in bulk in the container 20 are analyzed by the three-dimensional image recognition program stored in the storage unit of the image recognition unit 15, based on the three-dimensional image data read out from the three-dimensional imaging device 11. Out of these workpieces, a part (i.e., target workpiece) having image data conforming to a pre-stored model workpiece shape is retrieved, and a position and a posture of the retrieved part are recognized. The position and posture information recognized by the image recognition unit 15 is read out by the robot controller 16 through the network hub 17.

The robot controller 16 obtains a gripping position of the target workpiece 21 and an approach vector thereof in the world coordinate system by means of the aforementioned method, for example, based on the position and posture information recognized by the image recognition unit 15 (step S3).

Then, the robot controller 16 calculates an intersection point M between a straight line L extending along the approach vector through the gripping position of the target workpiece 2 and a plane F including the opening 22 by means of the aforementioned method, for example (step S4).

Then, the robot controller 16 judges whether the target workpiece 21 can be picked or not, based on a positional relationship between the calculated intersection point M and the opening 22 (step S5). Specifically, for example, the robot controller 16 judges whether the condition (non-interference condition), in which the intersection point M is located within the opening 22 and a shortest distance between the intersection point M and the peripheral part 23 defining the opening 22 is larger than a predetermined value, is satisfied or not.

When the non-interference condition is judged to be satisfied, the robot controller 16 causes the robot arm 12 to pick the workpiece 21 (step S6). In more detail, the robot controller 16 controls an operation of a drive unit of each articulation of the robot arm 12 such that the hand 13 of the robot arm 12 is moved from a standby position to an approach position, and is then linearly moved from the approach position to a gripping position of the workpiece along the approach vector. At this time, the hand 13 passes through a position which is located inside the opening 22 and is apart from the peripheral part 23 defining the opening 22 by the predetermined value $\Delta r$ or more. Thus, an interference between the hand 13 and the container 20 is prevented. Then, after the hand 13 has gripped the workpiece 21 at the gripping position of the workpiece, the hand 13 is linearly moved from the gripping position of the workpiece to the approach position along the approach vector. Also at this time, since the hand 13 passes through a position which is located inside the opening 22 and is apart from the peripheral part 23 defining the opening 22 by the predetermined value $\Delta r$ or more, an interference between the hand 13 or the workpiece 21 gripped by the hand 13 and the container 20 is prevented. Thereafter, the hand 13 gripping the workpiece 21 is moved from the approach position to the standby position or a predetermined release position of the workpiece.

On the other hand, when the condition is judged to be not satisfied, the robot controller 16 does not cause the robot arm 12 to pick the workpiece 21. In this case, the above respective steps S1 to S5 are sequentially repeated for another workpiece 21 to be gripped.

According to the above embodiment, before an operation of the robot arm 12, whether a workpiece 21 can be picked or not without any interference between the hand 13 or the workpiece 21 gripped by the hand 13 and the container 20 is previously judged by the control device 14, and such a judgment on whether the picking is possible or not is achieved by the simple method requiring shorter computing time. Thus, the workpiece 21 can be picked safely and efficiently, without damaging the hand 13 and the container 20.

In addition, according to this embodiment, since the predetermined value $\Delta r$ is 1 to 1.1 times any larger one of the maximum value $\Delta rw$ of the distance between the gripping position C and the profile of the workpiece 21 in the direction orthogonal to the approach vector and a maximum value $\Delta rh$ of the distance between the gripping position C and the profile of the hand 13 in the direction orthogonal to the approach vector, it can be reliably prevented that the hand 13 that is linearly moved along the approach vector or the workpiece 21 gripped by the hand 13 and the container 20 interfere with each other when picking.

In this embodiment, the control unit 14 is configured to judge whether the workpiece 21 can be picked or not based on the fact that the condition, in which the intersection point M is located within the opening 22, and a shortest distance between the intersection point M and the peripheral part 23 defining the opening 22 is larger than a predetermined value $\Delta r$, is satisfied or not. However, not limited thereto, even when the calculated intersection point M is located outside the opening 22, the control device 14 may judge that the workpiece 21 can be picked, by suitably performing some assisting operation such as changing a gripping position of the workpiece 21 or the like, In addition, in this embodiment, when obtaining a position of the peripheral part 23 defining the opening 22, the robot arm 12 is operated such that the hand 13 is brought into contact with the peripheral part 23 defining the opening 22, to thereby obtain the peripheral part 23. However, not limited thereto, there may be further provided, for example, a sensor (not shown) configured to detect a position of a position indicating marker disposed around the opening 22, and the control device 14 may obtain a position of the peripheral pare 23 defining the opening 22 based on a detection result of the sensor. In this case, although not specifically limited, an optical, electric or magnetic sensor is used as the sensor, for example. Alternatively, the three-dimensional imaging device 11 may be used as the sensor.

10 Picking apparatus
11 Three-dimensional imaging device
12 Robot arm
13 Hand
14 Control device
15 Image recognition unit
16 Robot controller
17 Network hub
20 Container
21 Workpiece
22 Opening
23 Peripheral part

What is claimed is:

1. A picking apparatus comprising:
    a three-dimensional imaging device configured to three-dimensionally image workpieces contained in bulk in a container;
    a robot arm comprising a hand configured to grip a workpiece; and
    a control device configured to control an operation of the robot arm;
    wherein the control device is configured:
      to recognize a position and a posture of a target workpiece, based on an imaging result of the three-dimensional imaging device;
      to obtain a gripping position of the workpiece and an approach vector of the gripping position, based on the recognized position and posture information;
      to calculate an intersection point between a straight line extending along the approach vector through the gripping position and a plane including an opening of the container; and
      to determine whether the workpiece can be picked or not, based on a positional relationship between the intersection point and the opening.

2. The picking apparatus according to claim 1, wherein the control device is configured:
    to determine whether a condition, in which the intersection point is located inside the opening and a shortest distance between the intersection point and a peripheral part defining the opening is larger than a predetermined value, is satisfied or not;
    to cause the robot arm to pick the workpiece, in response to determining the condition is satisfied; and
    not to cause the robot arm to pick the workpiece, in response to determining the condition is not satisfied.

3. The picking apparatus according to claim 2, wherein the predetermined value is 1 to 1.1 times any larger one of a maximum value of a distance between the gripping position and a profile of the workpiece in a direction orthogonal to the approach vector and a maximum value of a distance between the gripping position and a profile of the hand in the direction orthogonal to the approach vector.

4. The picking apparatus according to claim 1, wherein the control device is configured to operate the robot arm such that the hand is brought into contact with a peripheral part defining the opening, to thereby obtain a position of the peripheral part.

5. The picking apparatus according to claim 1, further comprising a sensor configured to detect a position of a position indicating marker disposed around the opening,
wherein the control unit is configured to obtain a position of a peripheral part defining the opening based on a detection result of the sensor.

6. A picking method comprising:
three-dimensionally imaging workpieces contained in bulk in a container; and
controlling an operation of a robot arm comprising a hand configured to grip a workpiece;
wherein the controlling of the operation of the robot arm includes:
recognizing a position and a posture of a target workpiece, based on an imaging result of the three-dimensionally imaging;
obtaining a gripping position of the workpiece and an approach vector of the gripping position, based on the recognized position and posture information;
calculating an intersection point between a straight line extending along the approach vector through the gripping position and a plane including an opening of the container; and
determining whether the workpiece can be picked or not, based on a positional relationship between the calculated intersection point and the opening.

7. The picking method according to claim 6, wherein the determining whether the workpiece can be picked or not includes:
determining whether a condition, in which the intersection point is located inside the opening and a shortest distance between the intersection point and a peripheral part defining the opening is larger than a predetermined value, is satisfied or not;
causing the robot arm to pick the workpiece, in response to determining the condition is satisfied; and
not causing the robot arm to pick the workpiece, in response to determining the condition is not satisfied.

8. The picking method according to claim 7, wherein the predetermined value is 1 to 1.1 times any larger one of a maximum value of a distance between the gripping position and a profile of the workpiece in a direction orthogonal to the approach vector and a maximum value of a distance between the gripping position and a profile of the hand in the direction orthogonal to the approach vector.

9. The picking method according to claim 6, further comprising operating the robot arm such that the hand is brought into contact with a peripheral part defining the opening to obtain a position of the peripheral part.

10. The picking method according to claim 6, further comprising:
detecting a position of a position indicating marker disposed around the opening; and
obtaining a position of a peripheral part defining the opening based on a detection result of the detecting.

11. The picking apparatus according to claim 2, wherein the control device is configured to operate the robot arm such that the hand is brought into contact with a peripheral part defining the opening to obtain a position of the peripheral part.

12. The picking apparatus according to claim 3, wherein the control device is configured to operate the robot arm such that the hand is brought into contact with a peripheral part defining the opening to obtain a position of the peripheral part.

13. The picking apparatus according to claim 2, further comprising a sensor configured to detect a position of a position indicating marker disposed around the opening,
wherein the control unit is configured to obtain a position of a peripheral part defining the opening based on a detection result of the sensor.

14. The picking apparatus according to claim 3, further comprising a sensor configured to detect a position of a position indicating marker disposed around the opening,
wherein the control unit is configured to obtain a position of a peripheral part defining the opening based on a detection result of the sensor.

15. The picking method according to claim 7, further comprising operating the robot arm such that the hand is brought into contact with a peripheral part defining the opening to obtain a position of the peripheral part.

16. The picking method according to claim 8, further comprising operating the robot arm such that the hand is brought into contact with a peripheral part defining the opening to obtain a position of the peripheral part.

17. The picking method according to claim 7, further comprising:
detecting a position of a position indicating marker disposed around the opening; and
obtaining a position of a peripheral part defining the opening based on a detection result of the detecting.

18. The picking method according to claim 8, further comprising:
detecting a position of a position indicating marker disposed around the opening; and
obtaining a position of a peripheral part defining the opening based on a detection result of the detecting.

* * * * *